(12) United States Patent
Wong et al.

(10) Patent No.: US 6,389,419 B1
(45) Date of Patent: May 14, 2002

(54) STORING AND RETRIEVING CONNECTION INFORMATION USING BIDIRECTIONAL HASHING OF CONNECTION IDENTIFIERS

(75) Inventors: Bruce F. Wong; William M. LeBlanc, both of Athens, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/413,743

(22) Filed: Oct. 6, 1999

(51) Int. Cl.[7] ............................................... G06F 17/30
(52) U.S. Cl. ......................................................... 707/7
(58) Field of Search ........................ 707/7, 2, 10, 104; 709/238; 711/108; 370/469, 255; 365/230.01

(56) References Cited

U.S. PATENT DOCUMENTS

| | | | | |
|---|---|---|---|---|
| 5,247,520 A | * | 9/1993 | Giese et al. ................. | 370/469 |
| 5,359,720 A | * | 10/1994 | Tamura et al. .............. | 711/108 |
| 5,633,858 A | * | 5/1997 | Chang et al. ................ | 370/255 |
| 5,757,795 A | | 5/1998 | Schnell ....................... | 370/392 |
| 5,790,669 A | * | 8/1998 | Miller et al. ................. | 380/25 |
| 6,061,734 A | * | 5/2000 | London ....................... | 709/238 |
| 6,201,755 B1 | * | 3/2001 | Pillar et al. ............. | 365/230.01 |

OTHER PUBLICATIONS

Knuth, Donald E., The Art of Computer Programming, vol. 3, Sorting and Searching, Second Edition, 1998, Addison-–Wesley, pp. 513–558.

* cited by examiner

*Primary Examiner*—Sanjiv Shah
(74) *Attorney, Agent, or Firm*—Van Pelt & Yi LLP (57) ABSTRACT

A network appliance is configured to store and retrieve instructions for handling a packet corresponding to a connection. The network appliance includes a connection storing processor configured to hash an incoming flow identifier for incoming packets to obtain an incoming hash; to hash an outgoing flow identifier for outgoing packets to obtain an outgoing hash; to insert an incoming entry corresponding to the incoming hash in a bidirectional hash table; and to insert an outgoing entry corresponding to the outgoing hash in a bidirectional hash table. A connection finding processor is configured to hash a packet identifier to obtain a packet hash; and to determine a matching entry in the bidirectional hash table that corresponds to the packet hash. A memory is configured to store the bidirectional hash table.

40 Claims, 12 Drawing Sheets

|          | Foreign     | Local  | Global      |
|----------|-------------|--------|-------------|
| Inbound  | Source      |        | Destination |
|          |             |        |             |
| Outbound | Destination | Source |             |

STORING AND RETRIEVING CONNECTION INFORMATION USING BIDIRECTIONAL HASHING OF CONNECTION IDENTIFIERS

CROSS REFERENCE TO RELATED APPLICATIONS

This application is related to co-pending U.S. patent application Ser. No. 08/850,248 entitled "Distributing Connections To A Group Of Machines" filed May 2,1997, which is incorporated herein by reference for all purposes.

FIELD OF THE INVENTION

The present invention relates generally to intercepting and processing packets that are related to a connection. More specifically, finding a connection object containing information related to the connection by looking once in a hash table that contains entries for packets sent in both directions between two parties is described.

BACKGROUND OF THE INVENTION

Various network appliances are used in networks to intercept packets and process packets. These appliances include load balancers, network address translation (NAT) devices, proxies, firewalls, and packet monitors. These devices monitor or modify packets on a network. In many cases, packets belonging to different connections are treated differently. Often, packets corresponding to different flows in the same connection are handled differently.

Figure 1A:
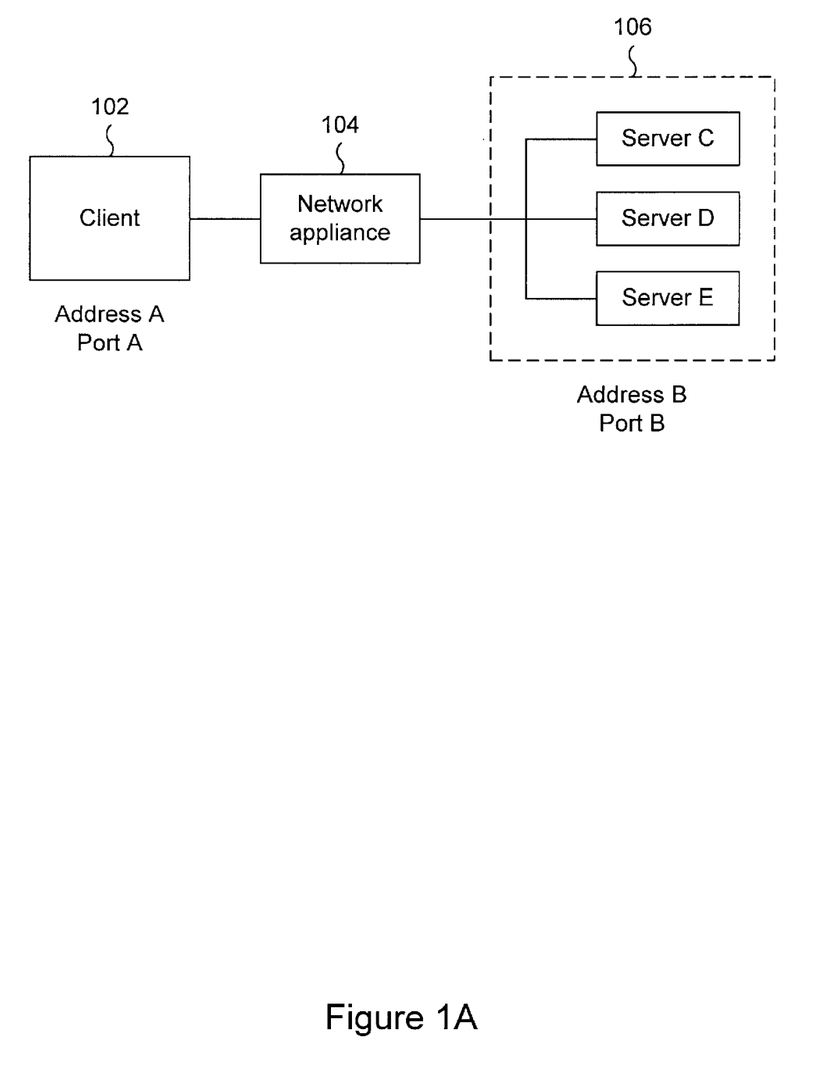
FIG. 1A is a block diagram illustrating a network that includes a client, a network appliance, and a set of servers.

Instructions for handling packets in different flows are stored by the network appliance for the purpose of determining how to handle incoming packets. These instructions must be accessed quickly so that packet processing is not unduly delayed. FIG. 1A is a block diagram illustrating a network that includes a client 102, a network appliance 104, and a set of servers 106. For the purpose of this illustration, network appliance 104 will be described as a NAT device that translates the destination address of certain packets sent from the client to a global IP address assigned to the group of servers. Network appliance 104 translates the global IP address used by the client to the local IP address of one of the servers selected to handle the connection with the client. The client IP address and port are referred to as the foreign IP address and port.

The network appliance modifies certain packets or records certain packets that belong to certain connections. A connection is made up of two flows, one in each direction between two parties. In general, a source address and port number, a destination address and port number, and a protocol define a flow. The source and destination addresses and ports are reversed for flows in opposite directions. For the purpose of illustration, this specification describes an example using only addresses as flow identifiers. It should be noted, whenever only an address is mentioned as an identifier, that an address and port may also be used and that a protocol may be added in some embodiments as well.

In the example shown in FIG. 1A, each connection is defined by a client IP address and port, a local IP address and port corresponding to the server selected to handle the connection, and a global IP address and port that corresponds to the IP address and port specified by the client for the connection. Packets passing through the network appliance are handled differently depending on whether they are a part of the flow from the client to the server or the flow from the server to the client. Therefore, network appliance 104 must, for each packet received, find a connection object that corresponds to the connection to which the packet belongs and also determine whether the packet is an incoming or an outgoing packet. For the purpose of this description, the terms incoming and outgoing are defined with reference to the server.

Figure 1B:
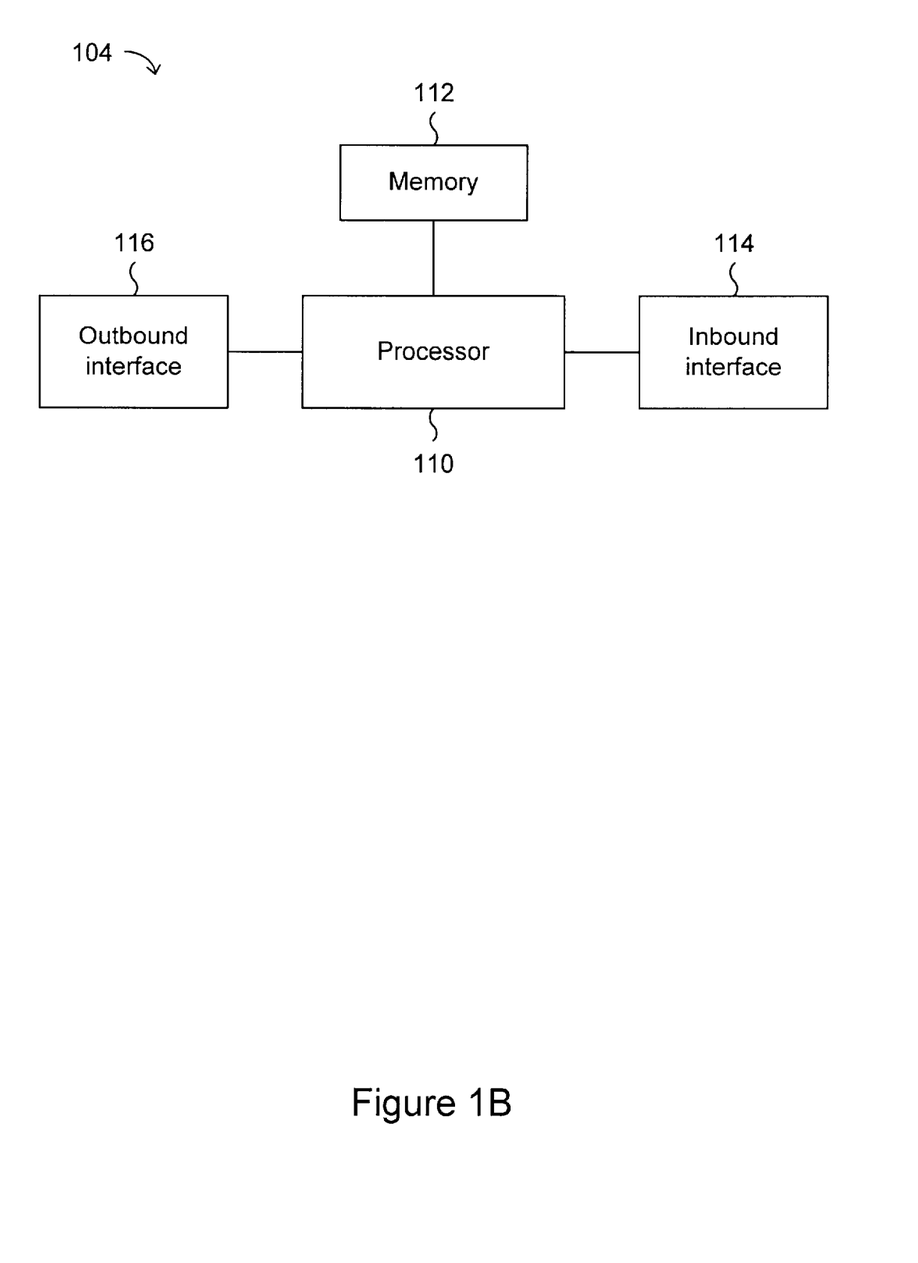
FIG. 1B is a block diagram illustrating the components of a typical network appliance.

FIG. 1B is a block diagram illustrating the components of a typical network appliance. A processor 110 is connected to a memory 112 and several inbound/outbound interfaces that allow the network appliance to send and receive packets. FIG. 1B shows an inbound interface 114 and an outbound interface 116. Each of the interfaces are intended to represent a large number of interfaces. In some embodiments, the inbound/outbound interfaces are distinguished by whether they are on the client side or the server side. The network appliance may be implemented on any suitable general purpose computer architecture, including a machine running UNIX or Microsoft Windows.

Figure 2A:
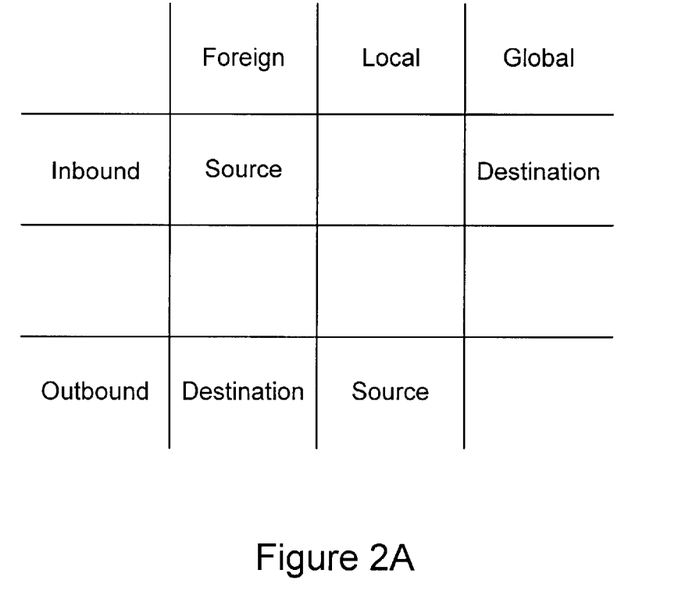
FIG. 2A is a chart illustrating which address is included as the source and destination address for inbound and outbound packets.

FIG. 2A is a chart illustrating which address is included as the source and destination address for inbound and outbound packets. For an inbound packet, the foreign address is the source address and the global address is the destination address. For an outbound packet, the foreign address is the destination address and the local address is the source address. The foreign address is included in both inbound and outbound packets as either the source address or the destination address. As a result, a connection object that corresponds to a packet can be located by hashing only the foreign address included in the connection object. A match in the hash table that corresponds to the connection object can be located by first searching using the source address of the packet and then searching using the destination address of the packet. If the connection object is found using the source address of the packet, then the packet is an inbound packet that includes the foreign address of the connection as its source address. If the search using the packet destination address locates the connection object, then the packet is an outbound packet and the foreign address of the connection is the destination address of the outbound packet. Thus, two lookups are required at most to locate a hash table entry that corresponds to the correct connection object.

Figure 2B:
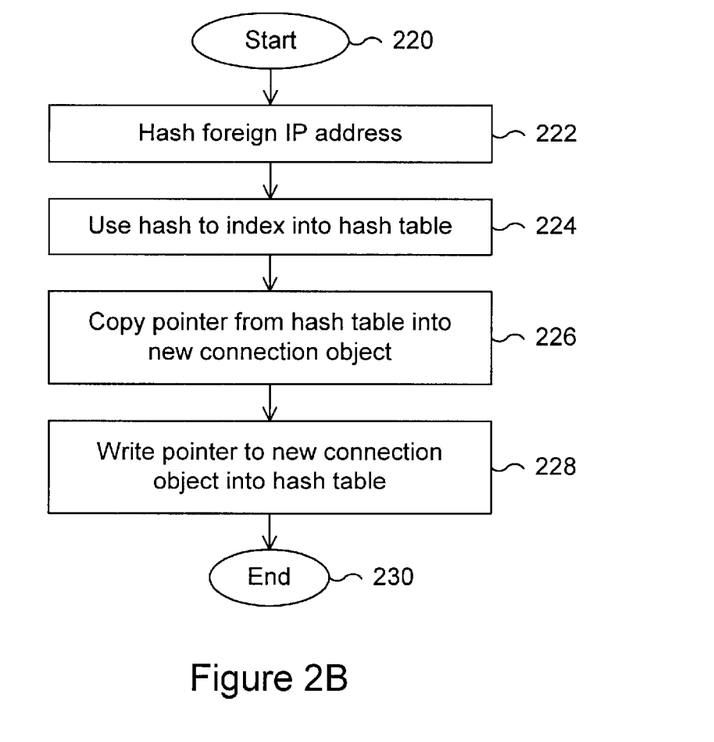
FIG. 2B is a flowchart illustrating a process for creating an new entry in a hash table for a new connection object.

FIG. 2B is a flowchart illustrating a process for creating a new entry in a hash table for a new connection object. The process starts at 220. In a step 222, the foreign IP address of the connection objects is hashed. Next, in a step 224, the hash is used to index into the hash table. In a step 226, the pointer from the hash table is copied into the new connection object. Then, in a step 228, a pointer to the new connection object is written into the hash table. The process ends at 230.

Figure 2C:
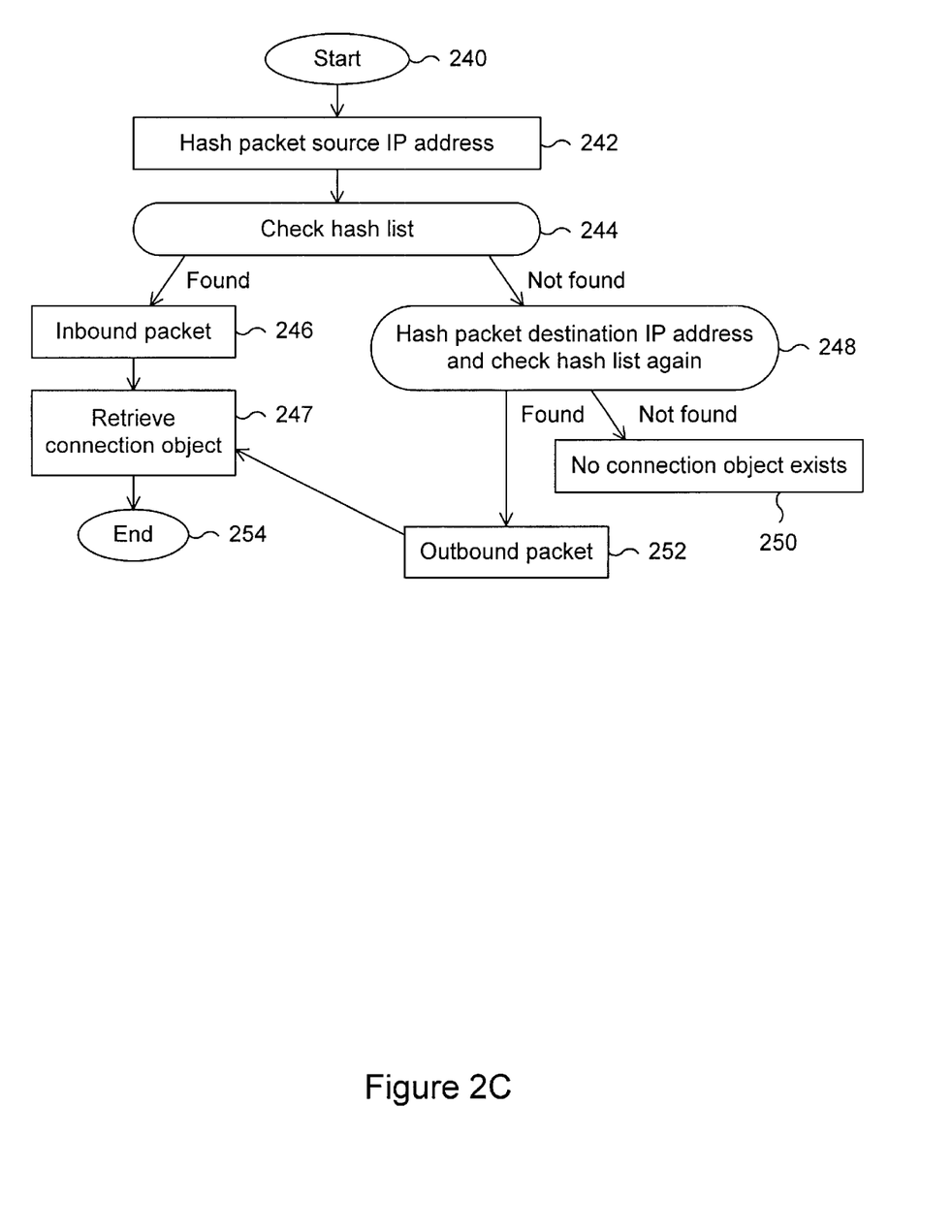
FIG. 2C is a flow chart illustrating a process for searching for a connection object when a packet is received.

FIG. 2C is a flow chart illustrating a process for searching for a connection object when a packet is received. The process starts at 240. In a step 242, the packet source IP address is hashed. Then, in a step 244, the hash list is checked to see if the source IP address hash is included in the list. If the source IP address hash is found, then in step 246, it is determined that the packet is an inbound packet. In a step 247, the connection object is retrieved and the process ends at 254.

If, in step 244, the source IP address hash is not found, then control is transferred to a step 248. In step 248, the packet destination IP address is hashed and the hash list is checked again. If the destination IP address hash is not found, then control is transferred to a step 250 and it is determined that no connection object exists. If the destination IP address hash is found, then control is transferred to a step 252 and it is determined that the packet is an outbound packet. Control is then transferred to step 247 and the connection object is retrieved. Thus, the connection object is retrieved and it is determined whether the packet is an inbound packet or an outbound packet.

Figure 2D:
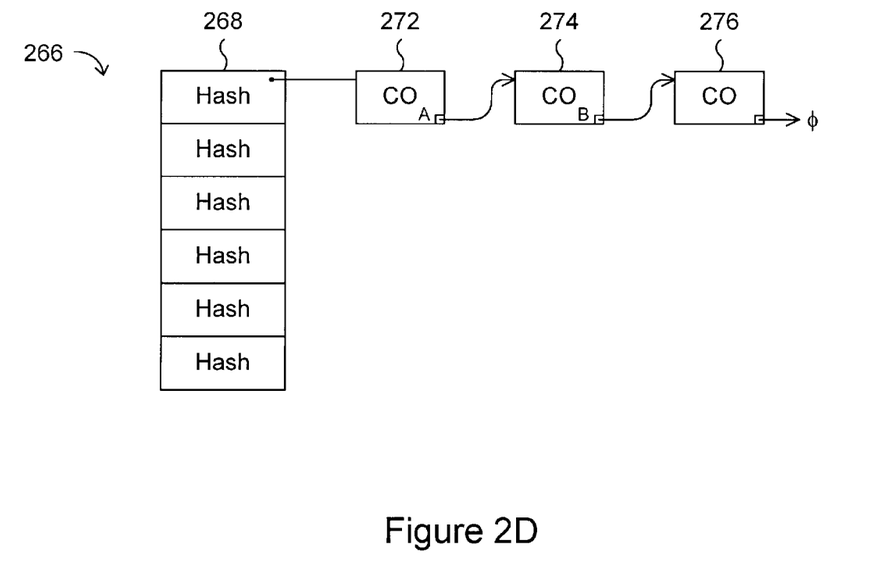
FIG. 2D is a block diagram illustrating a hash table and several connection objects which may be searched using the hash table.

FIG. 2D is a block diagram illustrating a hash table and several connection objects which may be searched using the hash table. Hash table 266 includes a hash 268. Hash 268 includes a pointer to a connection object 272. Connection object 272 points to connection object 274, which points to connection object 276. The pointer to connection object 272 was entered in the hash table using a process such as is described in FIG. 2B. The foreign IP address in connection object 272, as well as connection objects 274 and 276 hashes to hash 268. Connection object 276 is the last connection object in the hash chain and so it contains a null pointer.

Figure 2E:
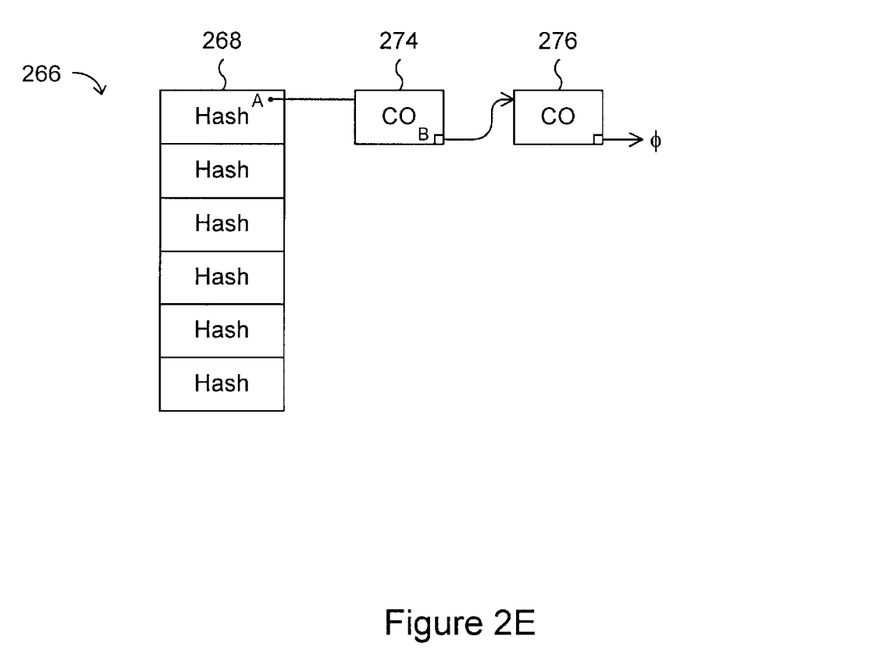
FIG. 2E is a block diagram illustrating hash table 266 just before connection object 272 is inserted in the hash table.

FIG. 2E is a block diagram illustrating hash table 266 just before connection object 272 is inserted in the hash table. Hash 268 includes a pointer labeled "A" that points to connection object 274. Connection object 274 includes a pointer labeled "B" that points to connection object 276. Connection object 272 is inserted by copying pointer A into connection object 272 and then overwriting pointer A in hash table 266 with a pointer to connection object 272. Pointer B in connection object 274 remains unchanged. Thus, connection object 272 is inserted at the beginning of the hash chain associated with hash 268.

When addresses are described as being hashed and used to find a connection object, more than one connection object may correspond to a set of addresses because different ports may be used for different connections between those addresses. The one connection object that matches a packet can be determined by examining the port numbers in a set of connection objects identified using the hash table. Alternatively, port numbers can be included in identifiers before hashing so that connection objects with different ports are not retrieved together. In general, the term flow identifier is used to describe any information in a connection object used to find the flows belonging to the connection object. The term packet identifier is used to describe any information in a packet header that is used to find the connection or flow corresponding to the packet. In the example described herein, the identifiers are combinations of IP addresses.

It would be useful if the lookup process for connection objects could be simplified and sped up for incoming packets. Since a very large number of packets is likely to be received for a given connection, the resources of the network appliance may be taxed as the lookup process is executed many times. Maximizing the efficiency of the lookup process would result in reduced latency in the network appliance.

SUMMARY OF THE INVENTION

Accordingly, a method is described for storing a connection object using a hash table and then finding the connection object that corresponds to a packet in a flow with a single lookup. Each connection object is hashed twice—once in each direction relative to a virtual server. For inbound packets, the foreign and global addresses are hashed, since those addresses correspond to the source and destination addresses of incoming packets. For outbound packets, the local and foreign addresses are hashed, since those addresses correspond to the source and destination addresses of outgoing packets. Two pointers, one for each hash, are entered in a hash table used to search for a connection object. The inbound and outbound hash table entries point to memory locations that contain information about whether the packet matching the hash table entry is inbound or outbound. The memory location may be part of a connection object or may point to a connection object. Thus, the connection object corresponding to a packet may be found by hashing the source and destination addresses of the packet and doing a single lookup in the hash table that contains hashes in both directions for each connection object.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a method of storing and retrieving instructions for handling a packet corresponding to a connection includes hashing an incoming flow identifier for incoming packets to obtain an incoming hash and hashing an outgoing flow identifier for outgoing packets to obtain an outgoing hash. An incoming entry corresponding to the incoming hash is inserted in a bidirectional hash table and an outgoing entry corresponding to the outgoing hash is inserted in the bidirectional hash table. A packet identifier is hashed to obtain a packet hash and a matching entry in the bidirectional hash table is determined that corresponds to the packet hash.

In one embodiment, a network appliance configured to store and retrieve instructions for handling a packet corresponding to a connection includes a connection storing processor configured to hash an incoming flow identifier for incoming packets to obtain an incoming hash; to hash an outgoing flow identifier for outgoing packets to obtain an outgoing hash; to insert an incoming entry corresponding to the incoming hash in a bidirectional hash table; and to insert an outgoing entry corresponding to the outgoing hash in a bidirectional hash table. A connection finding processor is configured to hash a packet identifier to obtain a packet hash; and to determine a matching entry in the bidirectional hash table that corresponds to the packet hash. A memory is configured to store the bidirectional hash table.

In one embodiment, a computer readable medium includes program code for storing and retrieving information for handling a packet corresponding to a connection. The program code comprising instructions for hashing an incoming flow identifier for incoming packets to obtain an incoming hash and hashing an outgoing flow identifier for outgoing packets to obtain an outgoing hash. An incoming entry corresponding to the incoming hash is inserted in a bidirectional hash table and an outgoing entry corresponding to the outgoing hash is inserted in the bidirectional hash table. A packet identifier is hashed to obtain a packet hash and a matching entry in the bidirectional hash table is determined that corresponds to the packet hash.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail in order not to unnecessarily obscure the present invention.

Figure 3A:
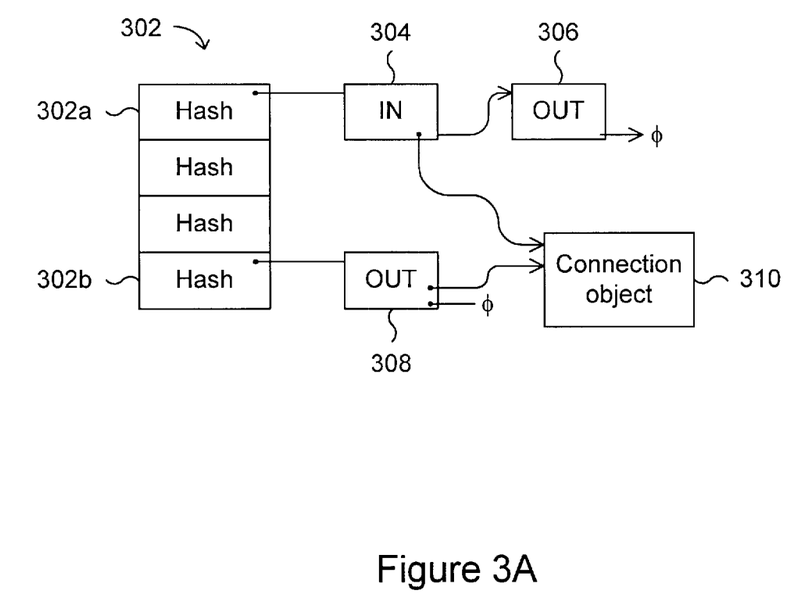
FIG. 3A is a block diagram illustrating a memory structure that includes a bi-directional hash table.

FIG. 3A is a block diagram illustrating a memory structure that includes a bi-directional hash table 302. Bi-directional hash table 302 allows the hash chain including the connection object that matches an incoming packet to be located after only a single hash table lookup. Bi-directional hash table 302 is generated by hashing not only the foreign IP address of each connection object. Instead, each connection object is hashed twice. First, the foreign IP address and global IP address are hashed (corresponding to an incoming packet.) Then, the local IP address and foreign IP address are hashed (corresponding to an outgoing packet.)

As a result of this bi-directional hashing, when a packet is received, the source and destination addresses of the packet may be hashed and a match in the hash table occurs for either the incoming hash or the outgoing hash generated for the connection object. In the example shown, hash 302A corresponds to an inbound packet. Hash 302A includes a pointer to an inbound/outbound object 304 with its inbound/outbound flag set, indicating that the hash table entry corresponds to an inbound packet. Inbound/outbound object 304 contains a pointer to a connection object 310 that corresponds to hash 302A. Inbound/outbound object 304 also includes a pointer to the next inbound/outbound object 306 on its hash chain. Inbound/outbound object 306 includes a null pointer since it is the last inbound/outbound object on its hash chain. Hash 302B corresponds to the hash of the local IP address and foreign IP address of an outbound packet. Hash 302B includes a pointer to an inbound/outbound object 308 with its inbound/outbound flag not set. Inbound/outbound object 308 includes a pointer to connection object 310. Inbound/outbound object 308 also contains a null pointer since it is the last inbound/outbound object on its hash chain.

Thus, inbound and outbound packets can be identified and connection object 310 can be accessed using a single lookup in hash table 302. Hash 302A is a match for inbound packets and it points to an inbound/outbound object that specifies both the connection object and the fact that the packet is an inbound packet. Likewise, hash 302B is found for an outbound packet. Hash 302B points to an inbound/outbound object that indicates that the packet is an outbound packet and also points to the connection object for the packet. An alternative hash table and connection object structure that does not use inbound/outbound objects is described in FIG. 4B.

Figure 3B:
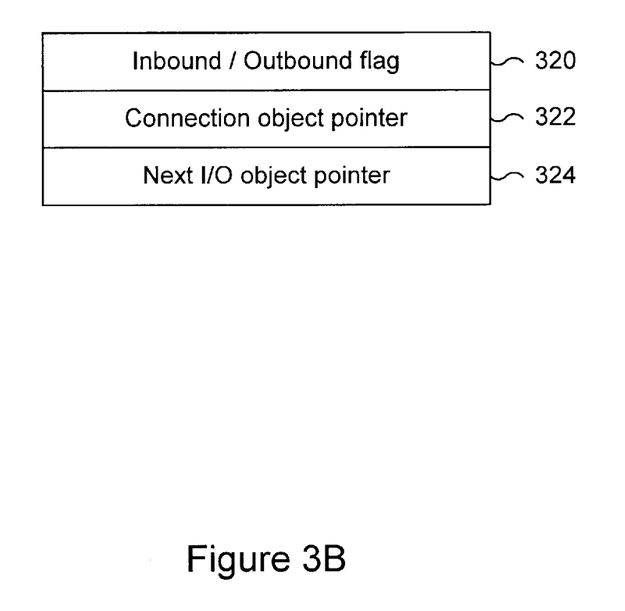
FIG. 3B is a block diagram illustrating the fields contained in an inbound/outbound object.

FIG. 3B is a block diagram illustrating the fields contained in an inbound/outbound object. An inbound/outbound flag 320 is set or not set for the purpose of indicating whether the packet is an inbound or an outbound packet. A connection object pointer 322 points to a connection object. A next inbound/outbound object pointer 324 points to the next inbound/outbound object in the hash chain. The inbound/outbound object may also include other fields that contain additional information, if desired.

Figure 3C:
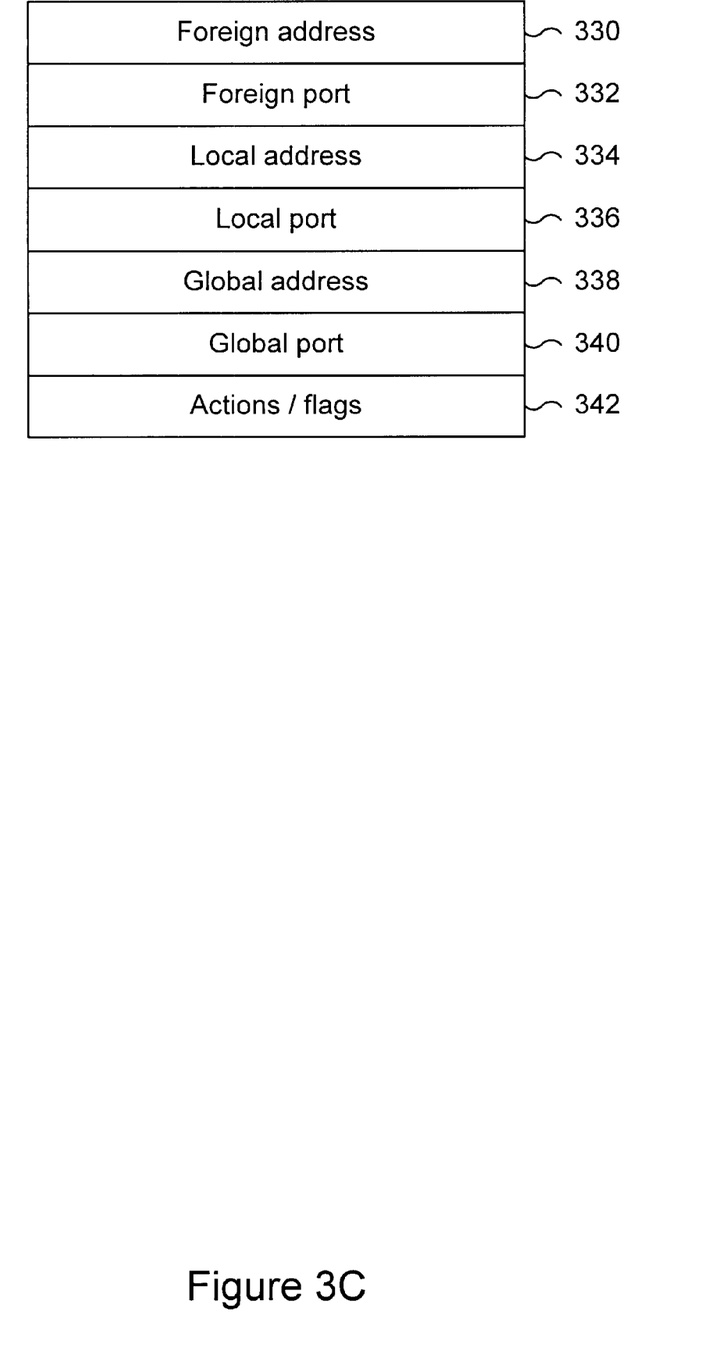
FIG. 3C is a block diagram illustrating the structure of a connection object.

FIG. 3C is a block diagram illustrating the structure of a connection object. The connection object includes a foreign address 330, a foreign port 332, a local address 334, a local port 336, a global address 338, and a global port 340. In addition, the connection object may also include other fields 342 that specify various actions to be performed on packets as well as various flags indicating the status of the connection or other information about the connection object. The connection object is used by the network appliance to determine what to do with the packets that it receives. Finding the connection object quickly is important to the performance of the network appliance. Finding the connection object with only a single hash table lookup using the structure shown in FIG. 3A greatly increases the efficiency of the connection object lookup process. This efficiency comes at the cost of requiring two hashes to be performed to add a connection object to the hash table (as well as two deletions when a connection object is deleted form the hash table). Also, both the source and destination addresses of incoming packets must be hashed before the hash table is searched. These additional requirements, however, are outweighed by the benefit of avoiding two hash table lookups for finding certain connection objects.

Figure 4A:
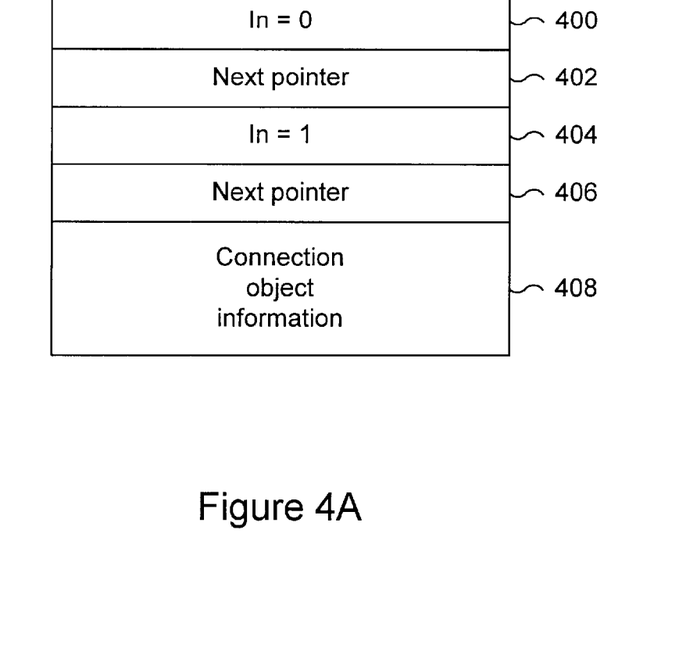
FIG. 4A is a block diagram illustrating a connection object used in an embodiment that does not require inbound/outbound objects.

FIG. 4A is a block diagram illustrating a connection object used in an embodiment that does not require inbound/outbound objects. Memory location 400 stores an inbound/outbound flag with a zero value. Any pointer that points to memory location 400 will point to the zero flag. The zero flag indicates that the packet that generated a match in the bi-directional hash table is an outbound packet. Memory location 402 is a pointer to the next connection object in the hash chain. Inbound/outbound flag 404 is in a different memory location than inbound/outbound flag 400. A hash table entry that points to inbound/outbound flag 404, which is set, corresponds to an inbound packet. The set flag indicates that the packet that generated the match with the hash table is an inbound packet. A pointer 406 to the next connection object in the hash chain is also included. Finally, connection object information 408 contains the information included in the connection object for handling packets.

Figure 4B:
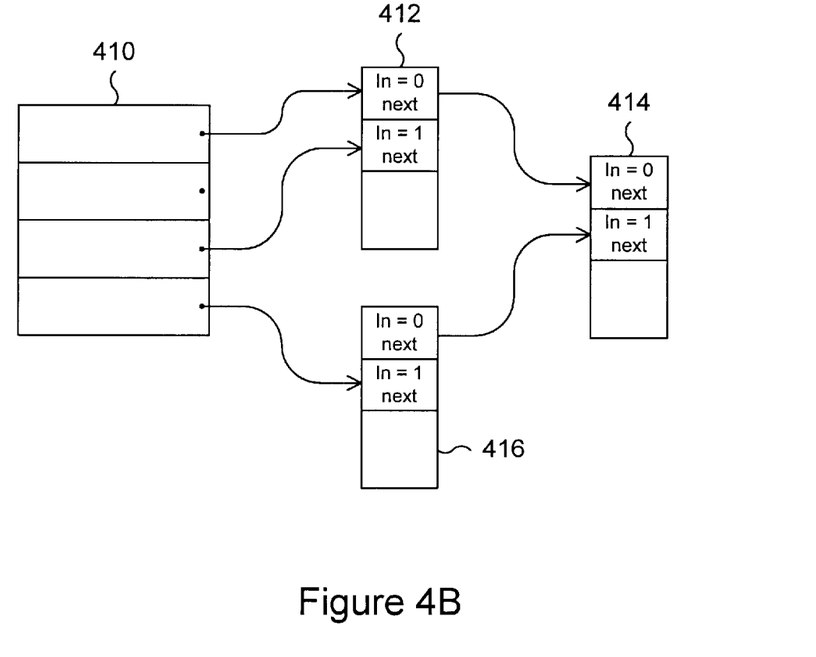
FIG. 4B is a block diagram illustrating an alternate memory structure that includes a bi-directional hash table.

FIG. 4B is a block diagram illustrating a memory structure that includes a bi-directional hash table 410. The use of the inbound/outbound objects is eliminated by including inbound/outbound flags in each connection object. Connection object 412 and connection object 416 are both part of a hash chain that includes connection object 414. Each connection object essentially acts as two different connection objects, one corresponding to an inbound flow and the other corresponding to an outbound flow.

When a hash that matches one of the hashes in the hash table is generated by the inbound flow identifier of the connection object, a pointer to the memory location in the connection object where the inbound/outbound flag is set is generated. Likewise, when the outbound flow identifier of a connection object is hashed, a pointer to the flag in the connection object that indicates an outbound flow is generated.

When the connection object is read, the memory location pointed to by the hash table or by the previous connection object in the hash chain immediately indicates whether the packet is inbound or outbound. The remainder of the information in the connection object may be accessed by offsetting the memory by an amount that corresponds to either the difference between the memory address of the inbound/outbound flag that is not set and the desired connection object element or the difference between the memory address of the inbound/outbound flag that is set and the memory address of the connection object element. By reading the inbound/outbound flag, the proper offset can be determined. Thus, without requiring an inbound/outbound object, the modified connection object shown enables a determination of whether a new packet is an inbound or an outbound packet.

Figure 5:
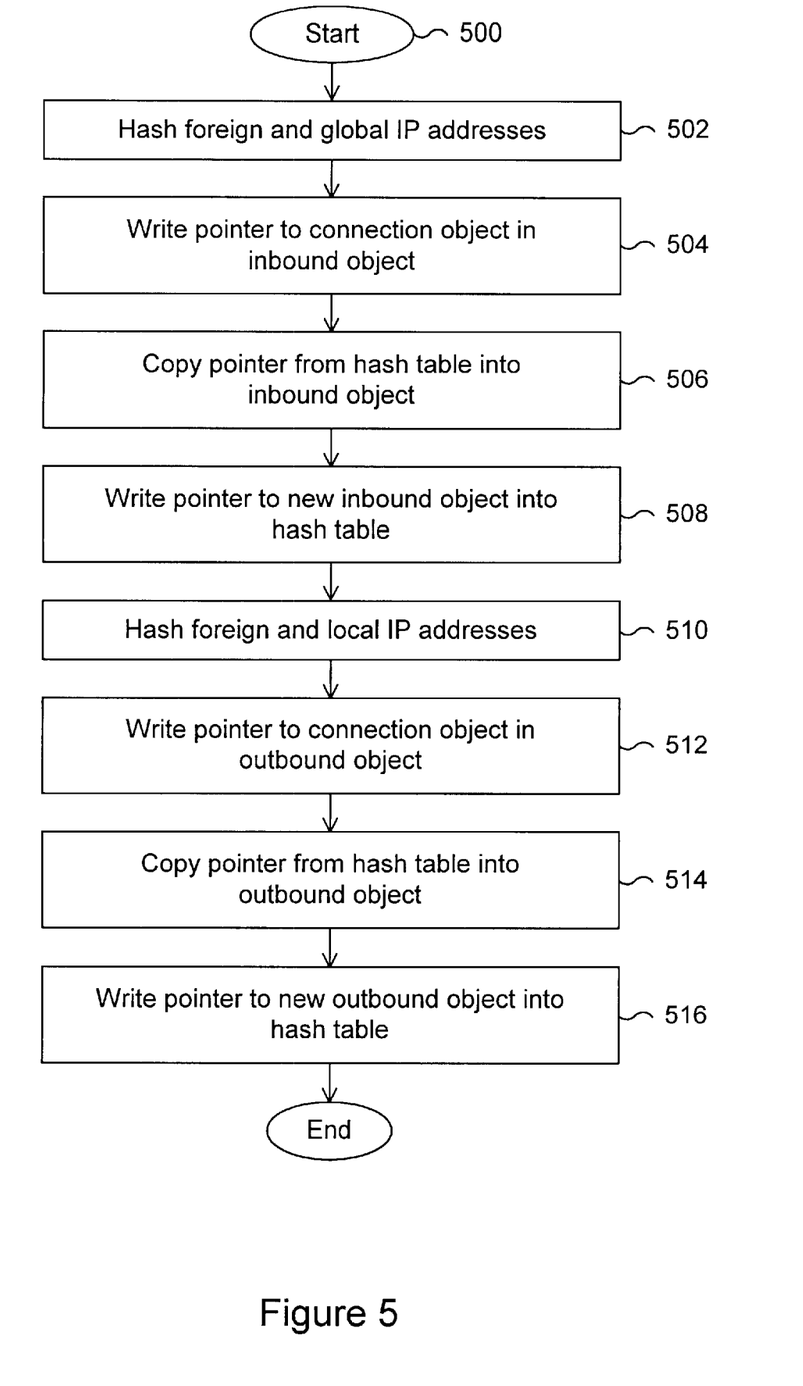
FIG. 5 is a flowchart illustrating a process for entering a new connection object in a hash table that uses inbound/outbound objects.

FIG. 5 is a flowchart illustrating a process for entering a new connection object in a hash table that uses inbound/outbound objects. The process starts at 500. At step 502, the foreign and global IP addresses of the connection object are hashed. Next, in a step 504, a pointer is written to the connection object in an inbound object. It should be noted that when the inbound/outbound flag is set, an inbound/outbound object is referred to as an inbound object and when the inbound/outbound flag is not set, an inbound/outbound object is be referred to as an outbound object.

In a step 506, the pointer from the hash table matching the foreign and global IP address hash is copied into the inbound object. In a step 508, a pointer to the new inbound object is copied into the hash table. After step 508, the hash table entry for inbound objects has been made.

In a step 510, the foreign and local IP addresses of the connection object are hashed. Next, in a step 512, a pointer to the connection object is inserted into an outbound object. In a step 514, a pointer from the hash table is copied into the outbound object. In a step 516, a pointer to the new outbound object is written into the hash table. The process then ends. Thus, two entries are made in the bi-directional hash table, one corresponding to each of the flows in different directions that make up the connection object.

Figure 6:
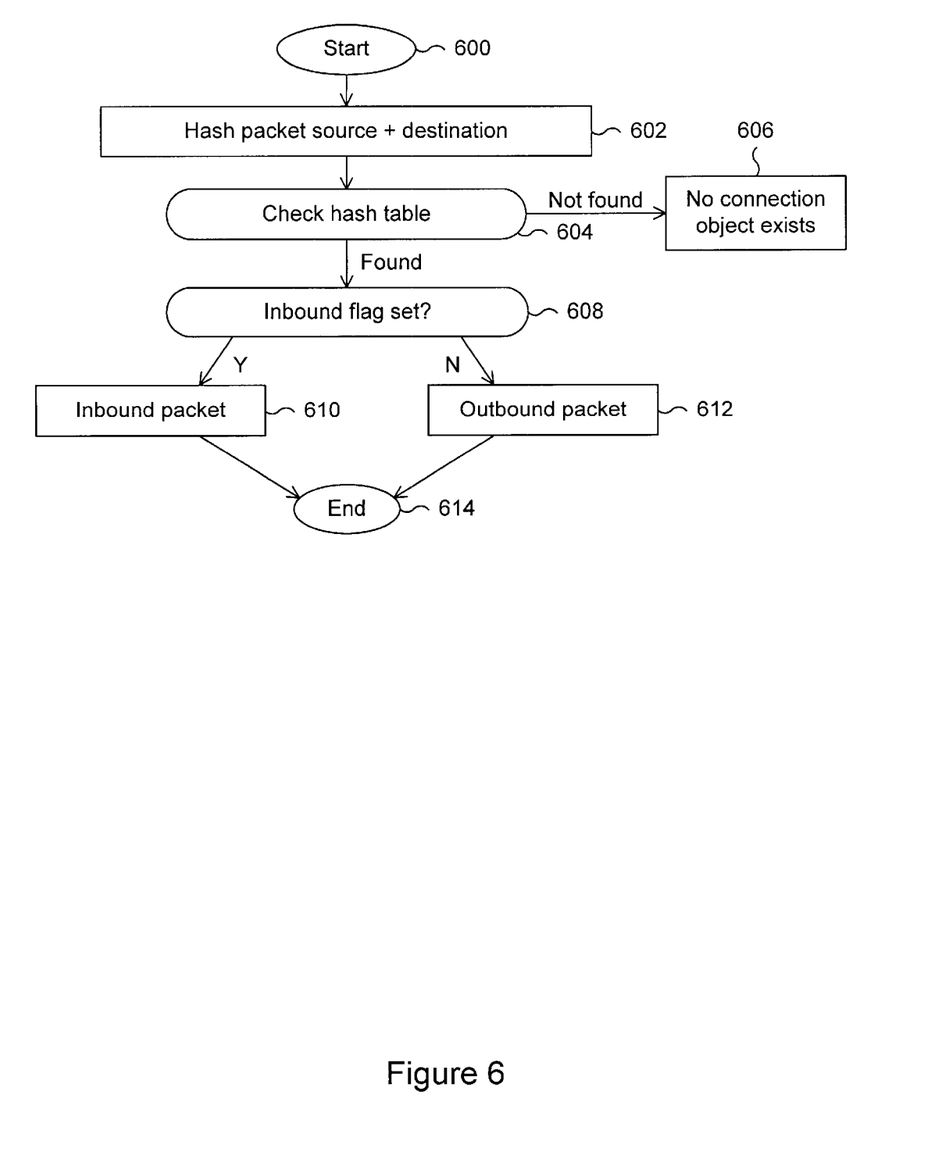
FIG. 6 is a flowchart illustrating a process for finding a connection object using the memory structure illustrated in FIG. 3A.

FIG. 6 is a flowchart illustrating a process for finding a connection object using the memory structure illustrated in FIG. 3A. The process starts a 600. In a step 602, the packet source and destination addresses are hashed. Next, in a step 604, the hash table is checked. The match looked for in the hash table depends on whether the pointer in the hash table points to an inbound/outbound flag that is set. If the inbound/outbound flag is set, then the connection object foreign and global addresses are compared to the packet source and destination addresses, respectively. If the inbound/outbound flag is not set, then the connection object local and foreign addresses are compared to the packet source and destination addresses, respectively. If a match to the packet source and destination address is not found, then control is transferred to a step 606 and it is determined that no connection object exists. If the hash is found, then a step 608 branches to either step 610 or 612 depending on whether the pointer in the hash table points to an inbound/outbound flag that is set. If the inbound/outbound flag is set, then it is determined in a step 610 that the packet is an inbound packet and the process ends at 614. If the inbound/outbound flag is not set in step 608, then control is transferred to a step 612 and it is determined that the packet is an outbound packet. The process then ends at 614.

Thus, a newly received packet is not hashed twice with each hash checked versus the hash table. Instead, both the source and the destination address of the packet are hashed and a single hash table lookup is performed to find the entry that corresponds to the connection object for the packet. Two separate hash table look ups, one for the source address and one for the destination address are not necessary. It is determined whether the packet is an inbound packet or an outbound packet by checking the value stored at the memory location inside the inbound/outbound object that the pointer in the hash table designates. Connection objects are found after at most one hash table look up instead after at most two lookups.

Figure 7:
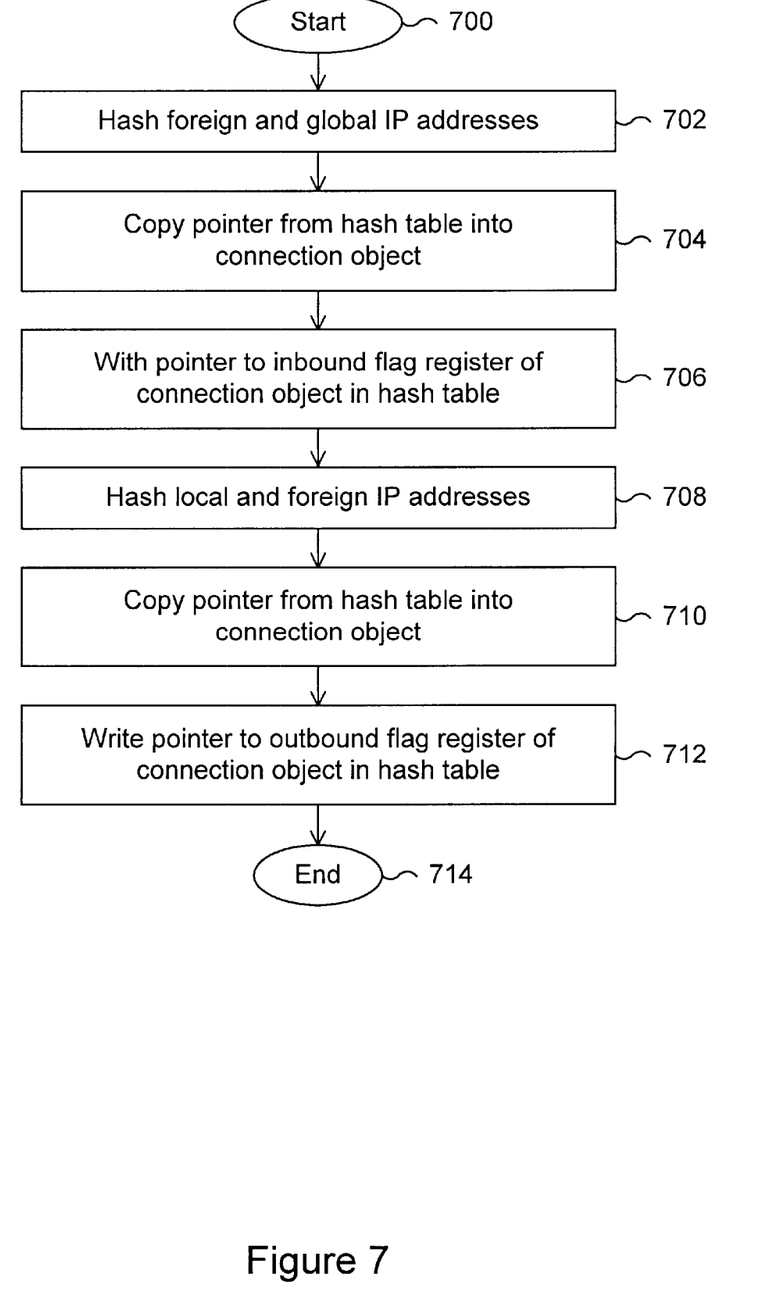
FIG. 7 is a flowchart illustrating a process for storing a new connection object using the memory structure illustrated in FIG. 4B.

FIG. 7 is a flowchart illustrating a process for storing a new connection object using the memory structure illustrated in FIG. 4B. The process starts at 700. In a step 702, the foreign and global IP addresses of the new connection object are hashed. Next, in a step 704, a pointer from the hash table is copied into the new connection object. In a step 706, a pointer to the inbound/outbound flag register of the connection object is written into the hash table. In a step 708, the local and foreign IP addresses of the connection object are hashed. The pointer is copied from the hash table into the connection object in a step 710. A pointer to the outbound flag register of the connection object is written into the hash table in a step 712. The process ends at 714.

Thus, the connection object includes both an inbound/outbound flag register and an outbound flag register. The inbound/outbound flag register indicates that an inbound packet has generated a match and the outbound register indicates that an outbound packet has generated a match. A matching hash points to either an inbound register or an outbound register and when the value of the register is read, it can be determined whether the matching packet is inbound or outbound. Inbound and outbound packets are discriminated without requiring another object such as inbound/outbound object to be defined. The memory location that is pointed to by the hash list indicates the type of packet that generated the match.

Figure 8:
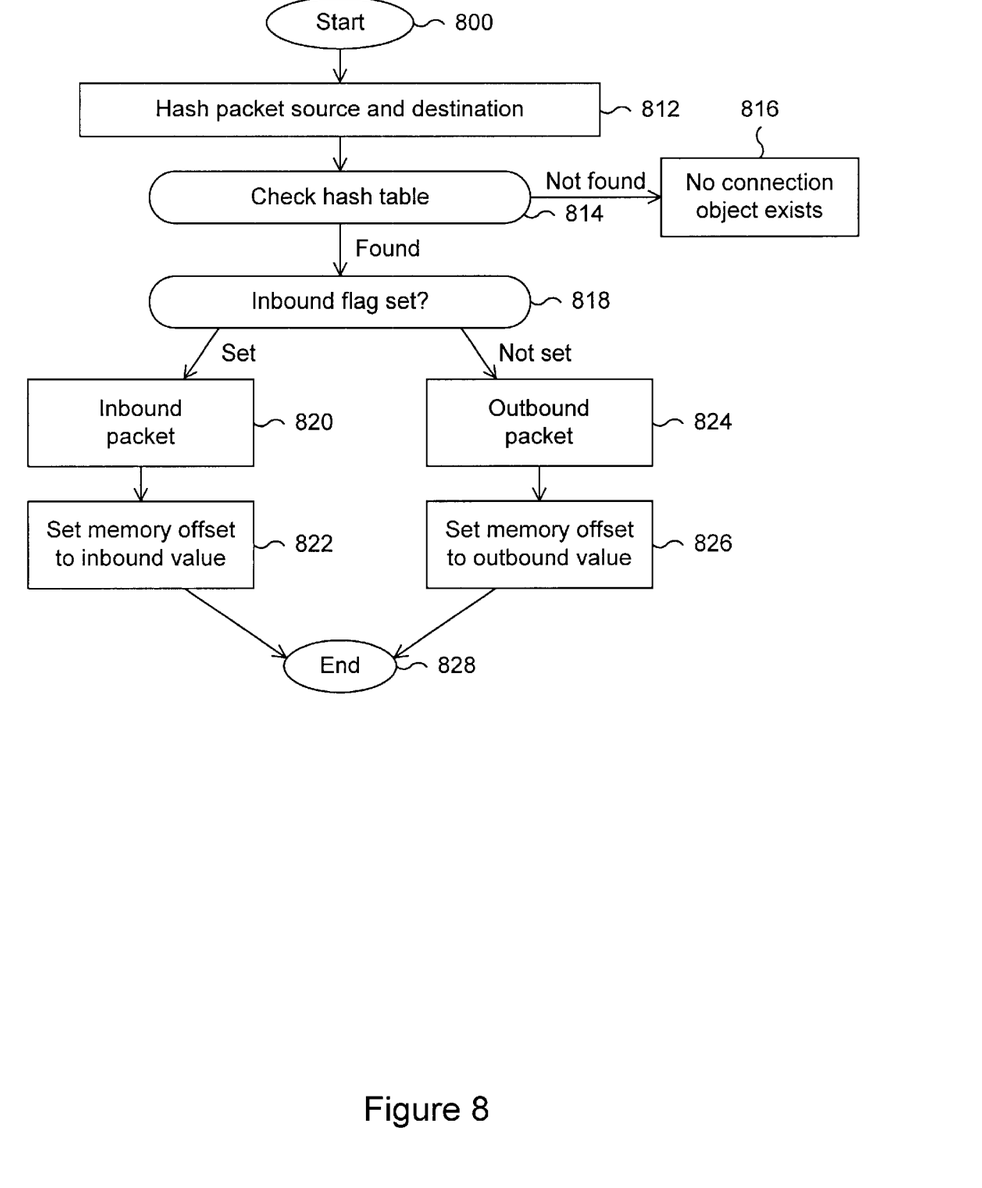
FIG. 8 is a flowchart illustrating a process for finding a connection object in the memory structure illustrated in FIG. 4B when a packet is received.

FIG. 8 is a flowchart illustrating a process for finding a connection object in the memory structure illustrated in FIG. 4B when a packet is received. The process starts at 800. In a step 812, the packet source and destination address are hashed. Then, in a step 814, the hash table is checked. The match looked for in the hash table depends on whether the pointer in the hash table points to an inbound/outbound flag that is set. If the inbound/outbound flag is set, then the connection object foreign and global addresses are compared to the packet source and destination addresses, respectively. If the inbound/outbound flag is not set, then the connection object local and foreign addresses are compared to the packet source and destination addresses, respectively. If a match to the packet source and destination address is not found, then control is transferred to a step 816 and it is determined that no connection object exists. If an element is found that matches the packet source and destination hash, then control is transferred to a step 818 and the memory location in the connection object that the hash table points to is checked to determine whether the inbound/outbound flag is set. If the flag is set, then control is transferred to a step 820 and it is determined that the new packet is an inbound packet. Then, in a step 822, a memory offset is set to the inbound value. The process then ends at 828. If, in step 818, it is determined that the inbound/outbound flag is not set, then it is determined that the packet is an outbound packet in step 824 and the memory offset is set to the outbound value in step 826. The process ends at 828.

Thus, when a new packet is received and a match is found in the hash table for the packet source and destination hash, the pointer in the hash table is followed to a memory location in the connection object. That memory location is read to determine whether an inbound/outbound flag is set or not. The state of the flag determines whether the packet that generated the match for the pointer is an inbound or outbound packet. The memory structure of the connection object includes two different flags. The memory offset between each of the flags and the other data in the connection object differs slightly as a result of the flags being located in slightly different places in the structure of the connection object. Therefore, the status of the inbound/outbound flag is used to determine a memory offset so that the rest of the data in the connection object may be read.

A bi-directional hashing technique for storing and retrieving connection objects using a bi-directional hash table has been described. Hash values are generated in the hash table for both inbound and outbound packets. The source and destination addresses of newly arrived packets are hashed and the inbound or outbound status is determined by the element in the hash table that generates a match. A pointer points to a memory location either in a connection object or an inbound/outbound object that indicates the inbound or outbound status of the newly arrived packet. If an inbound/outbound packet is used, a pointer to the connection object is included in the inbound/outbound object. Thus, the connection object containing instructions for handling the newly arrived packet may be found.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, the bi-directional hash table described herein may be used to store and retrieve connection objects for a NAT device that also translates the foreign IP address and port of incoming packets before forwarding such packets to one of the servers. In such a case, the foreign address and the global address could be used to generate the incoming hash and the local address and the address that replaces the foreign address could be used to generate the outgoing hash. Accordingly, the present embodiments are to be considered as illustrative and not restrictive, and the invention is not to be limited to the details given herein, but may be modified within the scope and equivalents of the appended claims.

What is claimed is:

1. A method of storing and retrieving instructions for handling a packet corresponding to a connection comprising:
   hashing an incoming flow identifier for incoming packets to obtain an incoming hash;
   hashing an outgoing flow identifier for outgoing packets to obtain an outgoing hash;
   inserting an incoming entry corresponding to the incoming hash in a bidirectional hash table;
   inserting an outgoing entry corresponding to the outgoing hash in the bidirectional hash table;
   hashing a packet identifier to obtain a packet hash; and
   determining a matching entry in the bidirectional hash table that corresponds to the packet hash.

2. A method as recited in claim 1 wherein the flow identifiers contain IP addresses.

3. A method as recited in claim 1 wherein the flow identifiers contain IP addresses and port numbers.

4. A method as recited in claim 1 wherein the incoming flow identifier includes a foreign address and a global address.

5. A method as recited in claim 1 wherein the incoming flow identifier includes a foreign address, a foreign port, a global address and a global port.

6. A method as recited in claim 1 wherein the incoming flow identifier includes a foreign address, a foreign port, a global address a global port and a protocol.

7. A method as recited in claim 1 wherein the outgoing flow identifier includes a local address and a foreign address.

8. A method as recited in claim 1 wherein the outgoing flow identifier includes a local address, a local port, a foreign address and a foreign port.

9. A method as recited in claim 1 wherein the outgoing flow identifier includes a local address, a local port, a foreign address, a foreign port and a protocol.

10. A method as recited in claim 1 wherein the matching entry points to a memory location that indicates whether the matching entry was inserted as an incoming entry or an outgoing entry.

11. A method as recited in claim 10 wherein the memory location is part of an inbound/outbound object that points to a connection object.

12. A method as recited in claim 11 further including determining a memory offset based on whether the memory location indicates that the matching entry was inserted as an incoming entry or an outgoing entry for the purpose of reading data from the connection object.

13. A method as recited in claim 10 wherein the memory location is part of a connection object.

14. A computer readable medium as recited in claim 1 wherein the flow identifiers contain IP addresses.

15. A computer readable medium as recited in claim 1 wherein the flow identifiers contain IP addresses and port numbers.

16. A computer readable medium as recited in claim 1 wherein the incoming flow identifier includes a foreign address and a global address.

17. A computer readable medium as recited in claim 1 wherein the incoming flow identifier includes a foreign address, a foreign port, a global address and a global port.

18. A computer readable medium as recited in claim 1 wherein the incoming flow identifier includes a foreign address, a foreign port, a global address a global port and a protocol.

19. A computer readable medium as recited in claim 1 wherein the outgoing flow identifier includes a local address and a foreign address.

20. A computer readable medium as recited in claim 1 wherein the outgoing flow identifier includes a local address, a local port, a foreign address and a foreign port.

21. A computer readable medium as recited in claim 1 wherein the outgoing flow identifier includes a local address, a local port, a foreign address a foreign port and a protocol.

22. A computer readable medium as recited in claim 1 wherein the matching entry points to a memory location that indicates whether the matching entry was inserted as an incoming entry or an outgoing entry.

23. A computer readable medium as recited in claim 22 wherein the memory location is part of an inbound/outbound object that points to a connection object.

24. A computer readable medium as recited in claim 22 wherein the memory location is part of a connection object.

25. A computer readable medium as recited in claim 22 further including determining a memory offset based on whether the memory location indicates that the matching entry was inserted as an incoming entry or an outgoing entry for the purpose of reading data from the connection object.

26. A network appliance configured to store and retrieve instructions for handling a packet corresponding to a connection comprising:
a connection storing processor configured to:
hash an incoming flow identifier for incoming packets to obtain an incoming hash;
hash an outgoing flow identifier for outgoing packets to obtain an outgoing hash;
insert an incoming entry corresponding to the incoming hash in a bi-directional hash table; and
insert an outgoing entry corresponding to the outgoing hash in a bi-directional hash table;
a connection finding processor configured to:
hash a packet identifier to obtain a packet hash; and
determine a matching entry in the bi-directional hash table that corresponds to the packet hash; and
a memory configured to store the bi-directional hash table.

27. A network appliance as recited in claim 26 wherein the connection storing processor and the connection finding processor are implemented on the same processor.

28. A network appliance as recited in claim 26 wherein the flow identifiers contain IP addresses.

29. A network appliance as recited in claim 26 wherein the flow identifiers contain IP addresses and port numbers.

30. A network appliance as recited in claim 26 wherein the incoming flow identifier includes a foreign address and a global address.

31. A network appliance as recited in claim 26 wherein the incoming flow identifier includes a foreign address, a foreign port, a global address and a global port.

32. A network appliance as recited in claim 26 wherein the incoming flow identifier includes a foreign address, a foreign port, a global address a global port and a protocol.

33. A network appliance as recited in claim 26 wherein the outgoing flow identifier includes a local address and a foreign address.

34. A network appliance as recited in claim 26 wherein the outgoing flow identifier includes a local address, a local port, a foreign address and a foreign port.

35. A network appliance as recited in claim 26 wherein the outgoing flow identifier includes a local address, a local port, a foreign address a foreign port and a protocol.

36. A network appliance as recited in claim 26 wherein the matching entry points to a memory location that indicates whether the matching entry was inserted as an incoming entry or an outgoing entry.

37. A network appliance as recited in claim 36 wherein the memory location is part of an inbound/outbound object that points to a connection object.

38. A network appliance as recited in claim 36 wherein the memory location is part of a connection object.

39. A network appliance as recited in claim 38 further including determining a memory offset based on whether the memory location indicates that the matching entry was inserted as an incoming entry or an outgoing entry for the purpose of reading data from the connection object.

40. A computer readable medium including program code for storing and retrieving information for handling a packet corresponding to a connection, the program code comprising instructions for.
hashing an incoming flow identifier for incoming packets to obtain an incoming hash;
hashing an outgoing flow identifier for outgoing packets to obtain an outgoing hash;
inserting an incoming entry corresponding to the incoming hash in a bi-directional hash table;
inserting an outgoing entry corresponding to the outgoing hash in a bi-directional hash table;
hashing a packet identifier to obtain a packet hash; and
determining a matching entry in the bidirectional hash table that corresponds to the packet hash.

* * * * *